US012633620B2

(12) United States Patent
Jin et al.

(10) Patent No.: US 12,633,620 B2
(45) Date of Patent: May 19, 2026

(54) SEPARATOR, BATTERY CELL, BATTERY AND ELECTRICAL APPARATUS

(71) Applicant: CONTEMPORARY AMPEREX TECHNOLOGY CO., LIMITED, Ningde (CN)

(72) Inventors: Haizu Jin, Ningde (CN); Lin Peng, Ningde (CN); Shuangjuan Peng, Ningde (CN); Baiqing Li, Ningde (CN); Fenggang Zhao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/289,109

(22) Filed: Aug. 4, 2025

(65) Prior Publication Data

US 2025/0364685 A1 Nov. 27, 2025

Related U.S. Application Data

(63) Continuation of application No. PCT/CN2023/088794, filed on Apr. 17, 2023.

(51) Int. Cl.

*H01M 50/426* (2021.01)
*H01M 10/0525* (2010.01)
*H01M 50/449* (2021.01)

(52) U.S. Cl.

CPC ..... *H01M 50/426* (2021.01); *H01M 10/0525* (2013.01); *H01M 50/449* (2021.01)

(58) Field of Classification Search

CPC . H01M 50/426; H01M 10/0525; H01M 50/44

(Continued)

(56) References Cited

U.S. PATENT DOCUMENTS

2017/0288192 A1* 10/2017 Chen .................. H01M 50/423
2018/0130988 A1 5/2018 Nishikawa et al.

(Continued)

FOREIGN PATENT DOCUMENTS

CN 103155217 A 6/2013
CN 105098121 A 11/2015

(Continued)

OTHER PUBLICATIONS

Poly(vinylidene fluoride). Datasheet [online]. SigmaAldrich, 2022 [retrieved on Oct. 7, 2025]. Retrieved from the Internet: <URL: https://www.sigmaaldrich.com/US/en/product/aldrich/182702>. (Year: 2022).*

(Continued)

*Primary Examiner* — Nicholas A Smith
*Assistant Examiner* — Kevin Nguyen
(74) *Attorney, Agent, or Firm* — XSENSUS LLP

(57) ABSTRACT

Provided in the present application are a separator, a battery cell, a battery and an electrical apparatus. The separator includes a separator body and a polymer layer disposed on at least one surface of the separator body, wherein the polymer layer includes a fluoropolymer, the crystallinity of the fluoropolymer as measured by using a differential scanning calorimetry method is $X_C$ %, where $0<X_C\leq30$; and the melting temperature of the fluoropolymer is $T_m$, the unit thereof being ° C., where $0<T_m\leq140$.

14 Claims, 3 Drawing Sheets

(58) Field of Classification Search
USPC ........................................................ 429/144
See application file for complete search history.

(56) References Cited

U.S. PATENT DOCUMENTS

| | | | | |
|---|---|---|---|---|
| 2019/0207190 | A1 | 7/2019 | Hu et al. | |
| 2023/0036332 | A1 * | 2/2023 | Kim .................. | H01M 10/0569 |

FOREIGN PATENT DOCUMENTS

| | | | | | |
|---|---|---|---|---|---|
| CN | 108598569 | A | | 9/2018 | |
| CN | 113054324 | A | | 6/2021 | |
| CN | 114497683 | A | | 5/2022 | |
| CN | 114725500 | A | | 7/2022 | |
| CN | 115004401 | A | | 9/2022 | |
| JP | 2006073467 | A | * | 3/2006 | |
| KR | 101430975 | B1 | * | 8/2014 | .......... H01M 50/451 |
| TW | 201523980 | A | | 6/2015 | |
| WO | 2022/160382 | A1 | | 8/2022 | |
| WO | 2023/059173 | A1 | | 4/2023 | |

OTHER PUBLICATIONS

Perfluoro propyl vinyl ether. Datasheet [online]. PubChem, 2016 [retrieved on Oct. 7, 2025]. Retrieved from the Internet: <URL: https://pubchem.ncbi.nlm.nih.gov/compound/Perfluoro_propyl-vinyl-ether>. (Year: 2016).*
English Translation of KR 101430975 B1 (Year: 2025).*
English Translation of JP 2006073467 A (Year: 2025).*
International Search Report and Written Opinion mailed on Dec. 5, 2023, received for PCT Application No. PCT/CN2023/088794, filed on Apr. 17, 2023, 9 pages including English Translation.
Extended European Search Report issued Mar. 9, 2026 in European Patent Application No. 23933347.9.

* cited by examiner

SEPARATOR, BATTERY CELL, BATTERY AND ELECTRICAL APPARATUS

CROSS-REFERENCE TO RELATED APPLICATION

The present application is a continuation of International Patent Application No. PCT/CN2023/088794, filed on Apr. 17, 2023, which is incorporated herein by reference in its entirety.

TECHNICAL FIELD

The present application relates to the field of batteries, and in particular to a separator, a battery cell, a battery and an electrical apparatus.

BACKGROUND

Because of the characteristics of a high capacity, a long service life and the like, battery cells are widely used in electronic devices, such as mobile phones, laptops, electromobiles, electric vehicles, electric airplanes, electric ships, electric toy cars, electric toy ships, electric toy airplanes, and electric tools, etc.

However, as the application range of batteries becomes more and more extensive, the requirements on the performances of the battery cells are becoming increasingly stringent. However, the storage performance of current battery cells is relatively poor and still needs to be further improved.

SUMMARY OF THE DISCLOSURE

The embodiments of the present application is made in view of the aforementioned problems, and an objective of the present application is to provide a separator, a battery cell, a battery, and an electrical apparatus.

A first aspect of the present application provides a separator. The separator includes a separator body and a polymer layer disposed on at least one surface of the separator body, wherein the polymer layer includes a fluoropolymer, the crystallinity of the fluoropolymer as measured by using a differential scanning calorimetry method is $X_C$ %, where $0<X_C\leq30$; and the melting temperature of the fluoropolymer is $T_m$, the unit thereof being ° C., where $0<T_m\leq140$.

The fluorine-based polymer used in the embodiments of the present application has relatively low crystallinity and melting temperature, so that the molecular chain arrangement tends to be loose, the interaction force among the molecular chains is small, adjacent molecular chains are easily opened, and the chain segment movement is achieved through intermolecular internal rotation, which makes it easy to exert its segment flexibility, forming a molecular chain structure with high flexibility. This is conducive to the rapid diffusion of an electrolyte solution among the molecular chains, and the construction of a three-dimensional connected interface between the separator and an electrode sheet. The interface has a network structure, which is conducive to increasing the rate of diffusion of active ions e.g. lithium ions from the electrolyte solution phase to the electrode sheet, and increasing the conductivity of the separator and reducing concentration polarization, so that the active ions are quickly embedded in the electrode sheet and evenly deposited, thereby improving the storage performance of the battery cell.

In some embodiments, the glass-transition temperature of the fluoropolymer is Tg, the unit thereof being ° C., wherein $-150\leq Tg\leq60$. The glass-transition temperature of the polymer is relatively low, the segment flexibility of the molecular chain is better, and adjacent molecular chains are easier to open.

In some embodiments, the fluoropolymer includes at least one of a building block of formula (I) to a building block of formula (II), formula (I)

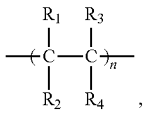

formula (II)

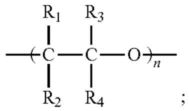

in the formula (I) and the formula (II), $R_1$, $R_2$, $R_3$ and $R_4$ each independently include a hydrogen atom, a fluorine atom, a chlorine atom, substituted or unsubstituted C1-C3 alkyl or substituted or unsubstituted C1-C3 alkoxy, and at least one of the $R_1$, the $R_2$, the $R_3$ and the $R_4$ includes a fluorine atom.

In some embodiments, the $R_1$, the $R_2$, the $R_3$ and the $R_4$ each independently include a hydrogen atom, a fluorine atom, a chlorine atom, substituted or unsubstituted C1-C2 alkyl or substituted or unsubstituted C1-C2 alkoxy; and further optionally, the $R_1$, the $R_2$, the $R_3$ and the $R_4$ each independently include a hydrogen atom, a fluorine atom, a chlorine atom, methyl, fluoromethyl, methoxy or perfluoromethoxy.

In some embodiments, the fluoropolymer includes a building block of formula (III), formula (III)

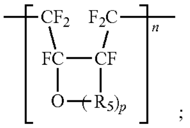

in the formula (III), $R_5$ includes a single bond, or substituted or unsubstituted C1-C3 alkyl; p is a positive integer selected from 1 to 3.

In some embodiments, the fluoropolymer includes at least one of a building block of formula (I-1) to a building block of formula (I-11), formula (I-1)

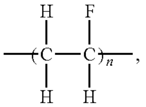

formula (I-2)

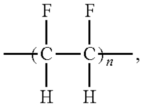

formula (I-3)

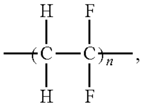

-continued formula (I-4)

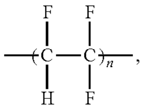

formula (I-5)

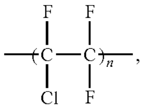

formula (I-6)

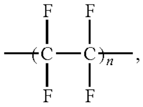

formula (I-7)

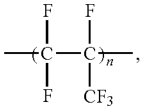

formula (I-8)

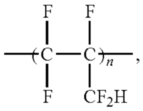

formula (I-9)

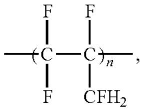

formula (I-10)

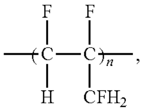

and formula (I-11)

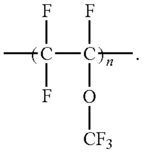

In some embodiments, the fluoropolymer further includes at least one of a building block of formula (II-1) to a building block of formula (II-5), formula (II-1)

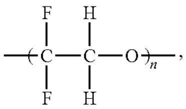

formula (II-2)

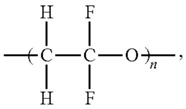

formula (II-3)

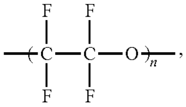

-continued formula (II-4)

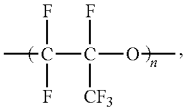

and formula (II-5)

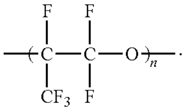

In some embodiments, the fluoropolymer further includes at least one of a building block of formula (III-1) to a building block of formula (III-3), formula (III-1)

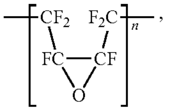

formula (III-2)

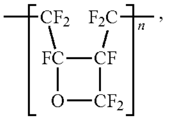

and formula (III-3)

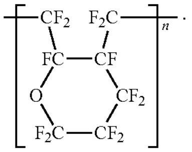

In some embodiments, n is a positive integer selected from 1,000 to 30,000.

In some embodiments, n is a positive integer selected from 5,000 to 20,000.

In some embodiments, the molecular weight of the fluoropolymer is $2\times10^5$ g/mol to $1.5\times10^6$ g/mol. When the molecular weight of the fluoropolymer is within the aforementioned range, the molecular chains of the fluoropolymer can be stretched in the electrolyte solution, but are not easily dissolved and dispersed completely by the electrolyte solution, which is beneficial to regulating the uniform distribution and dispersion of the molecular chains of the fluoropolymer in the electrolyte solution; and can further improve the flexibility among the molecular chains of the fluoropolymer. The interaction force among the molecular chains is relatively weak, which is beneficial for solvent molecules in the electrolyte solution to open the molecular chains, enter among the molecular chains, and be wrapped by the molecular chains, thereby facilitating the active ions to enter the active substance through the solvent, and thus realizing the smooth and rapid migration of the active ions.

In some embodiments, the fluoropolymer is added into a first solvent at 70° C. to form a fluoropolymer system. The fluoropolymer system is allowed to stand at 70° C. for 8 h and at 25° C. for ≥24 h, and then the fluoropolymer system is filtered through a 200-mesh filter to obtain a first substance, wherein the mass of the fluoropolymer is q, the unit thereof being g; the mass of the first substance is m, the unit thereof being g; and the fluoropolymer and the first substance satisfy: $5\leq m/q\leq1{,}000$. The embodiments of the present application can achieve the stretching of the molecular chains of the polymer within a safe working temperature range of the battery cell by increasing the temperature, thereby promoting the mutual attraction and physical bonding between the polymer molecular chains and the electrolyte solution. At room temperature, the activity of the molecular chain segments of the fluoropolymer is reduced. Remaining them attached to the surface of the separator body and locking the electrolyte solution in the spatial environment where the polymer is located to form a gel or a gel-like state, can increase the transmission rate of active ions e.g. lithium ions and improve the cycle performance and storage performance.

In some embodiments, the separator body includes a substrate, and the polymer layer is disposed on at least one surface of the substrate.

In some embodiments, the separator body includes a substrate and a heat-resistant coating, the heat-resistant coating is disposed on at least one surface of the substrate, and the polymer layer is disposed on a surface of the heat-resistant coating facing away from the substrate.

In some embodiments, the polymer layer further includes a heat-resistant particle. The synergistic effect of the heat-resistant particle and the fluoropolymer can further improve the overall heat resistance, ion transmission performance and the like of the separator.

In some embodiments, based on the total mass of the polymer layer, a ratio of the percentage mass content of the fluoropolymer to the percentage mass content of the heat-resistant particle is (0.2 to 5):1; and optionally (0.5 to 2):1. When the contents of the heat-resistant particle and the fluoropolymer are within the aforementioned ranges, the overall heat resistance, ion transmission performance and the like of the separator can be further improved.

In some embodiments, the coating weight of the polymer layer may be 0.5 mg/1,540.25 $mm^2$ to 5 mg/1,540.25 $mm^2$. When the coating weight of the polymer layer is within the aforementioned range, the overall heat resistance, ion transmission performance and the like of the separator can be further improved.

In a second aspect, the present application provides a battery cell including the separator according to any embodiment of the first aspect of the present application.

In a third aspect, the present application provides a battery including the battery cell according to any embodiment of the second aspect of the present application.

In a fourth aspect, the present application provides an electrical apparatus including the battery according to any embodiment of the third aspect of the present application.

BRIEF DESCRIPTION OF DRAWINGS

In order to explain the technical solution of the embodiments of the present application more clearly, the drawings that should be used in the embodiments of the present application will be briefly introduced hereafter. Obviously, the drawings described hereafter are only some embodiments of the present application, and for those of ordinary skills in the art, other drawings can be obtained according to these drawings without paying creative labor.

Figure 1:
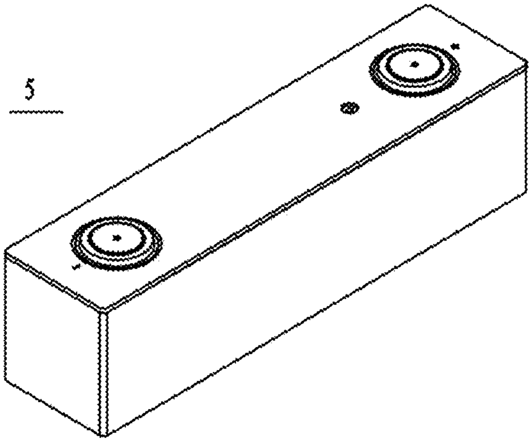
FIG. 1 is a schematic view of an embodiment of a battery cell of the present application.

The accompanying drawings may not be drawn according to the actual scale.

DESCRIPTION OF REFERENCE NUMERALS

1. battery pack; 2. upper box body; 3. lower box body; 4. battery module;
5. battery cell; 51. case; 52. electrode assembly;
53. cover plate;
6. electrical apparatus.

DETAILED DESCRIPTION

Hereinafter, embodiments specifically disclosing a separator, a battery cell, a battery, and an electrical apparatus of the present application are described in detail. However, there are cases where unnecessary detailed descriptions are omitted. For example, there are cases where detailed descriptions of well-known items and repeated descriptions of actually identical structures are omitted. This is to avoid unnecessary redundancy in the following descriptions and to facilitate understanding by those skilled in the art. In addition, the drawings and subsequent descriptions are provided for those skilled in the art to fully understand the present application, and are not intended to limit the subject matter recited in the claims.

"Ranges" disclosed in the present application are defined in the form of lower limits and upper limits, a given range is defined by the selection of a lower limit and an upper limit, and the selected lower limit and upper limit define boundaries of a particular range. A range defined in this manner may be inclusive or exclusive of end values, and may be arbitrarily combined, that is, any lower limit may be combined with any upper limit to form a range. For example, if the ranges of 60-120 and 80-110 are listed for a particular parameter, it is understood that the ranges of 60-110 and 80-120 are also contemplated. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a to b, where both a and b are real numbers. For example, the numerical range "0-5" means that all the real numbers between "0-5" have been listed herein, and "0-5" is just an abbreviated representation of combinations of these numerical values. In addition, when a parameter is expressed as an integer greater than or equal to 2, it is equivalent to disclosing that the parameter is, for example, an integer of 2, 3, 4, 5, 6, 7, 8, 9, 10, 11, 12, and the like.

Unless otherwise specified, all embodiments and optional embodiments of the present application may be combined with each other to form new technical solutions. Unless otherwise specified, all technical features and optional technical features of the present application may be combined with each other to form new technical solutions.

If not specifically stated, all steps of the present application may be performed sequentially or randomly, preferably sequentially. For example, a method includes steps (a) and (b), meaning that the method may include steps (a) and (b) performed sequentially, or may include steps (b) and (a)

performed sequentially. For example, the reference to the fact that the method may further include step (c), meaning that step (c) may be added to the method in any order. For example, the method may include steps (a), (b) and (c), or may further include steps (a), (c) and (b), or may further include steps (c), (a) and (b), and the like.

Unless otherwise specifically stated, "including" and "containing" mentioned in the present application may be open-ended, or may be closed-ended. For example, "including" and "containing" may indicate that it is possible to include or contain other components not listed, and it is also possible to include or contain only the listed components.

If not specifically stated, the term "or" is inclusive in the present application. For example, the phrase "A or B" means "A, B, or both A and B." More specifically, the condition "A or B" is satisfied under any one of the following conditions: A is true (or present) and B is false (or absent); A is false (or absent) and B is true (or present); or both A and B are true (or present).

In the present application, the terms "a plurality of" and "multiple" refer to two or more.

The term "alkyl" encompasses both straight and branched chain alkyl. For example, the alkyl may be C1-C5 alkyl, C1-C4 alkyl, C1-C3 alkyl, or C1-C2 alkyl. In some embodiments, the alkyl includes methyl, ethyl, propyl, isopropyl, butyl, isobutyl, and the like. Additionally, the alkyl may be optionally substituted. When substituted, the substituent includes a fluorine atom.

The term "alkoxy" refers to a group in which alkyl is connected to an oxygen atom via a single bond. For example, the alkoxy may be $C_1$ to $C_5$ alkoxy, $C_1$ to $C_3$ alkoxy, or $C_1$ to $C_2$alkoxy. In some embodiments, the alkoxy may include methoxy, ethoxy, and propoxy. Additionally, the alkoxy may be optionally substituted.

The term "halogen atom" refers to a fluorine atom, a chlorine atom, a bromine atom or the like.

The term "hydrogen" refers to 1H (protium, H), 2H (deuterium, D) or 3H (tritium, T). In various embodiments, the "hydrogen" may be 1H (protium, H).

The battery cell includes a positive electrode sheet, a negative electrode sheet, a separator, and an electrolyte solution. The separator is located between the positive electrode sheet and the negative electrode sheet to isolate the positive electrode sheet and the negative electrode sheet. There is a solid-liquid contact interface between the electrode sheets and the electrolyte solution, and a side reaction may occur at the contact interface, deteriorating the performance of the battery cell. Taking the positive electrode sheet as an example, there is a solid-liquid contact interface between a positive electrode active material contained in the positive electrode sheet and the electrolyte solution. In the interface, the positive electrode active material may undergo a side reaction with the electrolyte solution, causing the storage performance of the battery cell to deteriorate, and the side reaction may produce a product that is not conducive to the cycle of the battery cell, thereby deteriorating the storage performance of the battery cell.

In view of the aforementioned problems, the embodiments of the present application propose an separator from the perspective of constructing an interface. The separator includes a separator body and a polymer layer disposed on at least one surface of the separator body. The polymer molecular chains in the polymer layer have segment flexibility. When the separator is applied to a battery cell, the polymer layer is in contact with the electrolyte solution, the polymer molecular chains stretch and open, and the electrolyte solution can diffuse among the molecular chains, thereby constructing a three-dimensional connected interface between the separator and the electrode sheet. The interface has a network structure, which is beneficial to increasing the rate of diffusion of active ions e.g. lithium ions from the electrolyte solution phase to the electrode sheet, and to increasing the conductivity of the separator, reducing concentration polarization, and enabling active ions to be quickly intercalated in the electrode sheet and evenly deposited, thereby improving the storage performance of the battery cell.

Separator

In a first aspect, an embodiment of the present application provides a separator. The separator includes a separator body and a polymer layer disposed on at least one surface of the separator body, wherein the polymer layer includes a fluoropolymer, the crystallinity of the fluoropolymer as measured by using a differential scanning calorimetry method is $X_C$ %, where $0<X_C\leq30$; and the melting temperature of the fluoropolymer is Tm, the unit thereof being ° C., where $0<Tm\leq140$.

Crystallization refers to a process in which atoms, ions or molecules in a material are arranged in a certain spatial order to form an ordered structure. The conformation of the polymer in the crystallization is determined by both intramolecular and intermolecular factors. An intermolecular force will affect the stacking density among molecular chains. The crystallinity $X_C$ % is used for characterizing the degree of crystallinity in the material, which can be measured by a differential scanning calorimetry DSC method. Specifically, the test steps are: 0.5 g to 0.8 g of a sample is taken, placed into a carrying crucible, and subjected to heating and cooling treatment under a nitrogen atmosphere, The sample is heated from an initial temperature 20° C. lower than the intrinsic Tg of the material to a cutoff temperature 20° C. higher than the intrinsic Tm of the material at a heating rate of 10° C./min, and the actual glass-transition temperature Tg, melting temperature Tm and the like of the material are determined according to the endothermic and exothermic peaks or transition point of the material in the process.

Compared with the fluorine-based polymers commonly used in battery cells in the related art (as binders in an active material layer), which have relatively high crystallinity and melting temperature, this type of fluorine-based polymer has extremely high chain segment regularity and its molecular chain is easy to crystallize, thereby forming reverse constraints on the movement of the chain segments, and thus it is not suitable for the separator of the embodiment of the present application. The fluorine-based polymer used in the embodiments of the present application has relatively low crystallinity and melting temperature, so that the molecular chain arrangement tends to be loose, the interaction force among the molecular chains is small, adjacent molecular chains are easily opened, and the chain segment movement is achieved through intermolecular internal rotation, which makes it easy to exert its segment flexibility, forming a molecular chain structure with high flexibility. This is conducive to the rapid diffusion of an electrolyte solution among the molecular chains, and the construction of a three-dimensional connected interface between the separator and an electrode sheet. The interface has a network structure, which is conducive to increasing the rate of diffusion of active ions e.g. lithium ions from the electrolyte solution phase to the electrode sheet, and increasing the conductivity of the separator and reducing concentration polarization, so that the active ions are quickly embedded in the electrode sheet and evenly deposited, thereby improving the storage performance of the battery cell.

Illustratively, the crystallinity $X_C$ % of the fluoropolymer as measured by the differential scanning calorimetry method may be 5%, 10%, 15%, 20%, 25%, 30%, or a range consisting of any two of the aforementioned values.

Illustratively, the melting temperature of the fluoropolymer may be 10° C., 20° C., 50° C., 70° C., 90° C., 100° C., 120° C., 140° C., or a range consisting of any two of the aforementioned values.

In some embodiments, the glass-transition temperature of the fluoropolymer is Tg, the unit thereof being ° C., wherein $-150 \leq Tg \leq 60$.

The glass-transition temperature is a transition temperature at which the molecular chain segments of the polymer change from being frozen to moving. The glass-transition temperature has a certain influence on the flexibility of the polymer molecular chains. The flexibility of the polymer molecular chains at room temperature is better when the glass-transition temperature is lower, and the flexibility of the molecular chains at room temperature is worse when the glass-transition temperature is higher. The glass-transition temperature can be measured by the differential scanning calorimetry (DSC) method. The glass-transition temperature of the polymer is relatively low, the segment flexibility of the molecular chain is better, and adjacent molecular chains are easier to open. Illustratively, the glass-transition temperature of the fluoropolymer may be −150° C., −140° C., −120° C., −100° C., −80° C., −60° C., −30° C., 0° C., 30° C., 60° C., or a range consisting of any two of the aforementioned values.

In some embodiments, the fluoropolymer includes at least one of a building block of formula (I) to a building block of formula (III), formula (I)

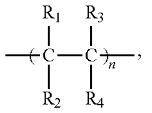

formula (II)

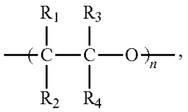

formula (III)

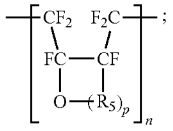

in the formula (I) and the formula (II), $R_1$, $R_2$, $R_3$ and $R_4$ each independently include a hydrogen atom, a fluorine atom, a chlorine atom, substituted or unsubstituted C1-C3 alkyl or substituted or unsubstituted C1-C3 alkoxy, and at least one of the $R_1$, the $R_2$, the $R_3$ and the $R_4$ includes a fluorine atom.

When the group is substituted, the substituent may include one or more of a nitrile group (—CN), a nitro group, a sulfonate group, sulfonyl, an amide group, carboxyl, an ester group, and a halogen atom. The aforementioned polymers are only examples of the structural groups of the main molecular chain. In the embodiments of the present application, the polymer may also be obtained by copolymerizing the aforementioned structural groups with a small amount of other types of structural groups (e.g., olefin building blocks, ester monomers, nitrile monomers, amide monomers, and the like building blocks).

In the formula (III), the $R_5$ includes a single bond, or substituted or unsubstituted C1-C3 alkyl; and when the group is substituted, the substituent includes a fluorine atom.

p is a positive integer selected from 1 to 3.

n is a positive integer selected from 1,000 to 30,000.

In some embodiments, $R_1$, $R_2$, $R_3$ and $R_4$ each independently include a hydrogen atom, a fluorine atom, a chlorine atom, substituted or unsubstituted C1-C2 alkyl, or substituted or unsubstituted C1-C2 alkoxy, and at least one of the $R_1$, the $R_2$, the $R_3$ and the $R_4$ includes a fluorine atom.

In some embodiments, the $R_1$, the $R_2$, the $R_3$ and the $R_4$ each independently include a hydrogen atom, a fluorine atom, a chlorine atom, methyl, fluoromethyl, methoxy or perfluoromethoxy.

In some embodiments, the fluoropolymer includes at least one of a building block of formula (I-1) to a building block of formula (I-11), formula (I-1)

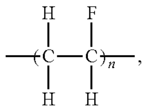

formula (I-2)

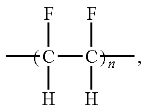

formula (I-3)

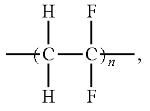

formula (I-4)

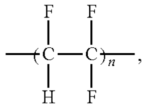

formula (I-5)

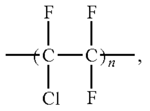

formula (I-6)

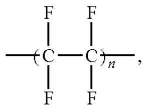

formula (I-7)

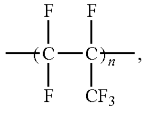

formula (I-8)

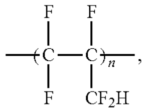

formula (I-9)

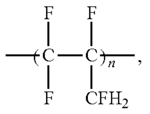

-continued formula (I-10)

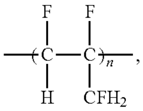

and formula (I-11)

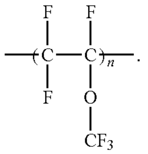

Alternatively, the fluoropolymer includes at least two of a building block of formula (I-1) to a building block of formula (I-11).

In some embodiments, the fluoropolymer includes at least one of a building block of formula (II-1) to a building block of formula (II-5), formula (II-1)

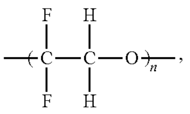

formula (II-2)

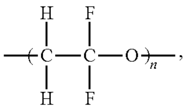

formula (II-3)

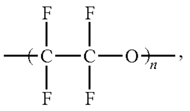

formula (II-4)

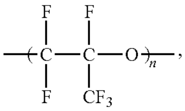

and formula (II-5)

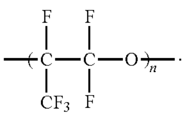

In some embodiments, the fluoropolymer includes at least one of a building block of formula (III-1) to a building block of formula (III-3), formula (III-1)

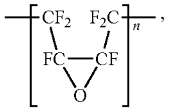

formula (III-2)

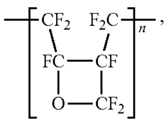

and

-continued formula (III-3)

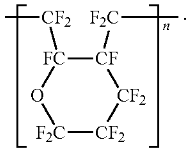

Illustratively, the fluoropolymer includes one or more of polyperfluoroethylene PTFE, polyvinylidene fluoride PVDF, a perfluoroethylene propylene copolymer FEP, a perfluoroalkoxy polymer PFA, perfluoropolyether PFPE, a polyvinylidene fluoride-hexafluoropropylene copolymer PVDF-HFP, a polyvinylidene fluoride-trifluoroethylene copolymer PVDF-TrFE, and a perfluoro(1-butenyl vinyl ether) polymer (referred to as CYTOP for short).

Alternatively, the fluoropolymer includes one or more of the polyperfluoroethylene PTFE, the polyvinylidene fluoride PVDF, the perfluoroethylene propylene copolymer FEP, the polyvinylidene fluoride-hexafluoropropylene copolymer PVDF-HFP, and the polyvinylidene fluoride-trifluoroethylene copolymer PVDF-TrFE.

The aforementioned fluoropolymer may be derived from one or more of the following monomers: fluorocycloethane, vinyl fluoride, 1,2-difluoroethylene, vinylidene fluoride, trifluoroethylene, chlorotrifluoroethylene, tetrafluoroethylene, hexafluoropropylene, 3,3,3-trifluoropropylene, trifluoropropylene, tetrafluoropropylene, pentafluoropropylene, and the like. Alternatively, the aforementioned fluoropolymer may be derived from at least two of the following monomers: fluorocycloethane, vinyl fluoride, 1,2-difluoroethylene, vinylidene fluoride, trifluoroethylene, chlorotrifluoroethylene, tetrafluoroethylene, hexafluoropropylene, 3,3,3-trifluoropropylene, trifluoropropylene, tetrafluoropropylene, and pentafluoropropylene.

The monomers used for the aforementioned fluoropolymers are all short-chain monomers, which are conducive to polymerization to form a linear or short-branched structure. This type of structure has a lower degree of entanglement, which is conducive to improving the flexibility of the molecular chain. The molecular chain can fully stretch in the electrolyte solution, thereby facilitating the formation of a three-dimensional interface between the separator and the electrode sheet.

The groups of the polymers of the embodiments of the present application can be detected by infrared spectrophotometry IR. Specifically, the polymers are tested by a Thermo Nicolet Nexus 670 Fourier transform infrared spectroscopy-attenuated total reflectance (FTIR-ATR) instrument, and then tested with reference to standard GB/T6040-2002. The test range is: for the ATR method, 600-4,000 $cm^{-1}$; reproducibility: ±2 $cm^{-1}$; resolution: better than 4 $cm^{-1}$; and transmission depth of 0.2-0.6 μm.

The structure of the polymer of the embodiments of the present application can also be tested by nuclear magnetic resonance (NMR). Specifically, 1H NMR and 13C NMR are performed on a Varian Mercury Plus-400 nuclear magnetic resonance instrument, the test temperature is 20° C., TMS is used as an internal standard, $CDCl_3$ is used as a solvent, and the proton resonance frequency is 400 MHz.

In some embodiments, n is a positive integer selected from 5,000 to 20,000.

In some embodiments, the molecular weight of the fluoropolymer is $2\times10^5$ g/mol to $1.5\times10^6$ g/mol.

When the molecular weight of the fluoropolymer is within the aforementioned range, the molecular chains of the fluoropolymer can be stretched in the electrolyte solution, but are not easily dissolved and dispersed completely by the electrolyte solution, which is beneficial to regulating the uniform distribution and dispersion of the molecular chains of the fluoropolymer in the electrolyte solution; and can further improve the flexibility among the molecular chains of the fluoropolymer. The interaction force among the molecular chains is relatively weak, which is beneficial for solvent molecules in the electrolyte solution to open the molecular chains, enter among the molecular chains, and be wrapped by the molecular chains, thereby facilitating the active ions to enter the active substance through the solvent, and thus realizing the smooth and rapid migration of the active ions. Illustratively, the molecular weight of the fluoropolymer may be $2\times10^5$ g/mol, $5\times10^5$ g/mol, $8\times10^5$ g/mol, $1\times10^6$ g/mol, $1.5\times10^6$ g/mol, or a range consisting of any two of the aforementioned values.

The molecular weight of a polymer has the meaning well known in the art, and can be determined using devices and methods commonly used in the art. It can be tested using gel permeation chromatography (GPC). The specific test steps are: an appropriate amount of a sample to be tested (as long as the sample concentration ensures a shading degree of 8%-12%) is taken, added with 20 ml of deionized water, and meanwhile subjected to external ultrasound for 5 min (53 KHz/120 W) to ensure that the sample is completely dispersed, and then determined according to GB/T19077-2016/ISO 13320:2009 standard.

Alternatively, a multi-angle laser light scattering instrument MALLS is used for testing, specifically, an instrument (Wyatt Technology Corporation, USA) combining a GPC with a Dawn Heleos II multi-angle laser light scattering device, an Optilab T-rEX refractive index (RI) detector and a Visco Star II viscometer is used. The test is carried out at 30° C., by using tetrahydrofuran as a mobile phase at a flow rate of 1.0 ml/min, and the SEC-SAMLL data is processed with commercial software ASTRA6 to obtain a molecular weight parameter.

When the fluoropolymer of the embodiments of the present application further satisfies one or more of the following conditions, the cycling performance and storage performance of the battery cell can be further improved.

In some embodiments, the fluoropolymer is added into a first solvent at 70° C. to form a fluoropolymer system. The fluoropolymer system is allowed to stand at 70° C. for 8 h and at 25° C. for ≥24 h. After the two stages of standing treatment, partial of the fluoropolymer system is transformed into a gel-state substance through swelling and adsorption, and then the fluoropolymer system is filtered through a 200-mesh filter to leave a first substance. The mass of the fluoropolymer is q, the unit thereof being g; the mass of the first substance is m, the unit thereof being g; and the fluoropolymer and the first substance satisfy: $5\leq m/q\leq 1{,}000$; optionally, $10\leq m/q\leq 1{,}000$; and further optionally, $10\leq m/q\leq 50$. Illustratively, m/q may be 5, 10, 20, 25, 28, 30, 32, 35, 40, 50, 80, 100, 200, 500, 1,000, or a range consisting of any two of the aforementioned values.

Illustratively, based on the mass of the fluoropolymer system, a ratio of the mass content of the fluoropolymer to the mass content of the first solvent ranges from 1:100 to 1:10, e.g. 3:50.

Illustratively, the first solvent is the same as or similar to the solvent of the electrolyte solution, and the first solvent may include at least one of a carbonate solvent and an ether solvent. For example, the carbonate solvent includes a cyclic carbonate solvent and/or a linear carbonate solvent.

As examples of the cyclic carbonate solvent, the cyclic carbonate solvent includes one or more of ethylene carbonate EC, vinylene carbonate VC, fluoroethylene carbonate FEC, difluoroethylene carbonate DFEC, vinyl ethylene carbonate VEC, and dicaprylyl carbonate CC.

As examples of the linear carbonate solvent, the linear carbonate solvent includes one or more of dimethyl carbonate DMC, diethyl carbonate DEC, ethyl methyl carbonate EMC, diphenyl carbonate DPC, methyl allyl carbonate MAC, and polycarbonate VA.

As examples of the ether solvent, the ether solvent includes one or more of tetrahydrofuran THF, 2-methyltetrahydrofuran 2me-thf, 1,3-dioxolane DOL, dimethoxymethane DMM, 1,2-dimethoxyethane DME, and diglyme DG.

Alternately, the first solvent may meanwhile further contain a lithium salt and an electrolyte solution additive, e.g. lithium hexafluorophosphate, vinylene carbonate VC, fluorovinylene carbonate FEC, and the like.

In the present application, m/q is also referred to as a precipitation value, which characterizes the ability of the polymer and the solvent to transform into the gel-state substance.

The first substance mainly includes the gel-state substance formed by the polymer and the first solvent. In this type of gel-state substance, the molecular structure of the polymer substantially does not change.

In some embodiments, the first substance is dried at 80° C. for 12 h to remove the first solvent in the first substance, and the main component of the first substance after drying is the fluoropolymer described above, as determined by infrared spectrophotometry IR or tested by nuclear magnetic resonance NMR.

The embodiments of the present application can achieve the stretching of the molecular chains of the polymer within a safe working temperature range of the battery cell by increasing the temperature, thereby promoting the mutual attraction and physical bonding between the polymer molecular chains and the electrolyte solution. At room temperature, the activity of the molecular chain segments of the fluoropolymer is reduced. Remaining them attached to the surface of the separator body and locking the electrolyte solution in the spatial environment where the polymer is located to form a gel or a gel-like state, can increase the transmission rate of active ions e.g. lithium ions and improve the cycle performance and storage performance.

In an embodiment of the present application, the separator includes a separator body and a polymer layer, and the polymer layer is disposed on at least one surface of the separator body, which means that the polymer layer can be disposed on one of the surfaces of the separator body or on both surfaces of the separator body. Since the separator body has various structural forms, the polymer layer has various arrangement forms accordingly. The fluoropolymer can be dispersed in a solvent to form a polymer mixed system, and the polymer mixed system is coated onto the separator body through a coating process such as atomization spraying, gravure coating, etc.

In some embodiments, the separator body includes a substrate, and the polymer layer is disposed on at least one surface of the substrate.

In some other embodiments, the separator body includes a substrate and a heat-resistant coating, the heat-resistant coating is disposed on at least one surface of the substrate, and the polymer layer is disposed on a surface of the heat-resistant coating facing away from the substrate. It can be understood that the heat-resistant coating can be disposed on one of the surfaces of the substrate, or on both surfaces of the substrate.

The embodiments of the present application have no specific limitation on the material of the substrate, and any well-known substrate with good chemical stability and mechanical stability can be selected. For example, the substrate may include at least one of a porous polyolefin-based resin film (e.g. at least one of polyethylene, polypropylene, and polyvinylidene fluoride), a porous glass fiber, and a porous non-woven cloth. The substrate may be a single-layer film or a multi-layer composite film. When the substrate is the multi-layer composite film, the materials of the layers may be the same or different.

In some embodiments, the porosity of the substrate is greater than or equal to 25%; and optionally 25% to 50%. When the porosity of the substrate is within the aforementioned range, the air permeability of the substrate can be improved, which is beneficial to the migration of active ions. Moreover, since the porosity is relatively small, the mechanical performance of the substrate can be improved, and a good support effect can be provided for the polymer layer.

In some embodiments, the thickness of the substrate may be less than or equal to 16 μm, and optionally 5 μm to 12 μm. Illustratively, the thickness of the substrate may be 1 μm, 2 μm, 3 μm, 5 μm, 10 μm, 12 μm, 15 μm, 16 μm, or a range consisting of any two of the aforementioned values.

The heat-resistant coating can include a heat-resistant particle. in some embodiments, the heat-resistant particle includes at least one of an inorganic particle and an organic particle. The heat resistance performance of the separator can be improved by adding the heat-resistant particle.

In some embodiments, the percentage mass content of the inorganic particle in the heat-resistant coating is ≤30. Illustratively, the percentage mass content of the inorganic particle in the heat-resistant coating may be 1%, 2%, 3%, 4%, 5%, 6%, 7%, 8%, 9%, 10%, 15%, 20%, 25%, 30%, or a range consisting of any two of the aforementioned values.

The inorganic particle may include at least one of an inorganic particle having a dielectric constant of 5 or more, an inorganic particle having the ability to transmit active ions, and an inorganic particle capable of undergoing electrochemical oxidation and reduction.

In some embodiments, the inorganic particle having a dielectric constant of 5 or more may include at least one of boehmite (γ-AlOOH), aluminum oxide ($Al_2O_3$), barium sulfate ($BaSO_4$), magnesium oxide (MgO), magnesium hydroxide ($Mg(OH)_2$), a silicon oxide compound $SiO_x$ ($0<x\leq 2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), hafnium dioxide ($HfO_2$), cerium oxide ($CeO_2$), zirconium titanate ($ZrTiO_3$), barium titanate ($BaTiO_3$), magnesium fluoride ($MgF_2$), $Pb(Zr,Ti)O_3$ (abbreviated as PZT), $Pb_{1-m}La_mZr_{1-n}Ti_nO_3$ (abbreviated as PLZT, $0<m<1$, $0<n<1$), and $Pb(Mg_3Nb_{2/3})O_3$—$PbTiO_3$ (abbreviated as PMN-PT).

In some embodiments, the inorganic particle having the ability to transmit active ions may include at least one of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), and $P_2S_5$ type glass ($Li_xP_yS_z$, $0<x<3$, $0<y<3$, $0<z<7$).

In some embodiments, the inorganic particle capable of undergoing electrochemical oxidation and reduction may include at least one of a lithium-containing transition metal oxide, a lithium-containing phosphate with an olivine structure, a carbon-based material, a silicon-based material, a tin-based material, and a lithium-titanium compound.

In some embodiments, the heat-resistant coating may further include other organic particles. For example, the organic particle may include at least one of polystyrene, polyethylene, polyimide, a melamine resin, a phenolic resin, polypropylene, polyester (e.g., polyethylene terephthalate, polyethylene naphthalate, polybutylene terephthalate), polyphenylene sulfide, polyaramid, polyamideimide, polyimide, a copolymer of butyl acrylate and ethyl methacrylate, and a mixture thereof.

In some embodiments, the coating further includes a binder. As an example, the binder may include at least one of an aqueous solution type acrylic resin (e.g., a homopolymer of acrylic acid, methacrylic acid, or sodium acrylate monomers, or a copolymer of them with other comonomers), polyvinyl alcohol (PVA), a isobutylene-maleic anhydride copolymer, and polyacrylamide.

In some embodiments, the heat-resistant coating may have a thickness of ≤4 μm. Therefore, it facilitates the improvement in the energy density of the battery cell. In the embodiments of the present application, the thickness of the heat-resistant coating refers to the thickness of the heat-resistant coating on a single side of the substrate. Illustratively, the thickness of the heat-resistant coating may be 0.1 μm, 0.5 μm, 1 μm, 1.5 μm, 2 μm, 2.5 μm, 3 μm, 3.5 μm, 4 μm, or a range consisting of any two of the aforementioned values.

In some embodiments, the polymer layer may further include a heat-resistant particle. The heat-resistant particle and the fluoropolymer may work synergistically to further improve the overall heat resistance, ion transmission performance and the like of the separator. The fluoropolymer and the heat-resistant particle can be dispersed in a solvent to form a polymer mixed system, and the polymer mixed system is coated onto the separator body through a coating process such as atomization spraying, gravure coating, etc.

In some embodiments, based on the total mass of the polymer layer, a ratio of the percentage mass content of the fluoropolymer to the percentage mass content of the heat-resistant particle is (0.2 to 5.0):1; and optionally (0.5 to 2.0):1. When the contents of the heat-resistant particle and the fluoropolymer are within the aforementioned ranges, the overall heat resistance, ion transmission performance and the like of the separator can be further improved. Illustratively, the ratio of the percentage mass content of the fluoropolymer to the percentage mass content of the heat-resistant particle can be 0.2:1, 0.3:1, 0.4:1, 0.5:1, 0.6:1, 0.8:1, 1.0:1, 1.2:1, 1.5:1, 1.8:1, 2.0:1, 2.5:1, 2.8:1, 3.0:1, 3.2:1, 3.5:1, 3.8:1, 4.0:1, 4.2:1, 4.5:1, 4.8:1, 5.0:1, or a range consisting of any two of the aforementioned values.

In some embodiments, the coating weight of the polymer layer may be 0.5 mg/1,540.25 $mm^2$ to 5 mg/1,540.25 $mm^2$. When the coating weight of the polymer layer is within the aforementioned range, the overall heat resistance, ion transmission performance and the like of the separator can be further improved.

Optionally, the coating weight of the polymer layer may be 0.5 mg/1,540.25 $mm^2$ to 3.5 mg/1,540.25 $mm^2$.

Illustratively, the coating weight of the polymer layer may be 0.5 mg/1,540.25 $mm^2$, 0.6 mg/1,540.25 $mm^2$, 0.8 mg/1, 540.25mm$^2$, 1.0 mg/1,540.25 mm$^2$, 1.2 mg/1,540.25 mm$^2$, 1.5 mg/1,540.25 mm$^2$, 1.8 mg/1,540.25 mm$^2$, 2.0 mg/1,540.25 mm$^2$, 2.5 mg/1,540.25 mm$^2$, 3 mg/1,540.25 mm$^2$, 3.5 mg/1,540.25 mm$^2$, 4 mg/1,540.25 mm$^2$, 4.5 mg/1,540.25 mm$^2$, 5 mg/1,540.25 mm$^2$, or a range consisting of any two of the aforementioned values.

In the embodiments of the present application, the coating weight of the polymer layer refers to the single-sided gram weight. For example, if both sides of the substrate are provided with the polymer layer, this refers to the coating weight of the polymer layer on one side of the substrate.

The coating weight has a well-known meaning in the art and can be detected by using devices and methods well known in the art. The coating weight of the polymer in the separator can be obtained by cutting the same master roll substrate and the separator into small discs of 1,540.25 mm$^2$, weighing 10 small discs of the separator respectively, and calculating.

Battery Cell

In a second aspect, an embodiment of the present application proposes a battery cell. The battery cell includes an electrode assembly and an electrolyte. The electrode assembly includes a positive electrode sheet, a negative electrode sheet and a separator. The separator is disposed between the positive electrode sheet and the negative electrode sheet, and the separator includes the separator according to any embodiment of the first aspect of the present application.

[Positive Electrode Sheet]

The positive electrode sheet includes a positive electrode current collector and a positive electrode active material layer disposed on at least one surface of the positive electrode current collector.

As an example, the positive electrode current collector has two surfaces opposite in its own thickness direction, and the positive electrode active material layer is disposed on either one or both of the two opposite surfaces of the positive electrode current collector.

The positive electrode active material layer includes a positive electrode active material. The positive electrode active material can be a positive electrode active material for a battery cell well known in the art. As an example, the positive electrode active material may include at least one of the following materials: a lithium-containing phosphate compound, a lithium-containing transition metal oxide, a sodium-containing phosphate compound, and a sodium-containing transition metal oxide.

Illustratively, the olivine-type phosphate active material (the lithium-containing phosphate compound) has a general formula of: $Li_xA_yMe_aM_bP_{1-c}X_cY_z$, where $0 \le x \le 1.3$, $0 \le y \le 1.3$, and $0.9 \le x+y \le 1.3$; $0.9 \le a \le 1.5$, $0 \le b \le 0.5$, and $0.9 \le a+b \le 1.5$; $0 \le c \le 0.5$; $3 \le z \le 5$; A includes one or more of Na, K, and Mg; Me includes one or more of Mn, Fe, Co, and Ni; M includes one or more of B, Mg, Al, Si, P, S, Ca, Sc, Ti, V, Cr, Cu, Zn, Sr, Y, Zr, Nb, Mo, Cd, Sn, Sb, Te, Ba, Ta, W, Yb, La, and Ce; X includes one or more of S, Si, Cl, B, C, and N; and Y includes one or more of O and F. Specifically, the olivine-type phosphate active material includes one or more of $LifePO_4$, $LiMnPO_4$, $LiNiPO_4$, and $LiCoPO_4$.

Illustratively, the lithium transition metal oxide may be a layered material, e.g. ternary, lithium nickel oxide, lithium cobalt oxide, lithium manganese oxide, lithium-rich layered and rock salt-phase layered materials, etc. The layered-structure positive electrode active material has a general formula of: $Li_xA_yNi_aCo_bMn_cM_{(1-a-b-c)}Y_z$, where $0 \le x \le 2.1$, $0 \le y \le 2.1$, and $0.9 \le x+y \le 2.1$; $0 \le a \le 1$, $0 \le b \le 1$, $0 < c \le 1$, and $0.1 \le a+b+c \le 1$; $1.8 \le z \le 3.5$; A includes one or more of Na, K, and Mg; M includes one or more of B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, and Ce; and Y includes one or more of O and F. Alternatively, y=0. Specifically, the layered-structure positive electrode active material may include one or more of lithium cobalt oxide LCO, lithium nickel oxide LNO, lithium manganese oxide LMO, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), and NCA.

In some embodiments, the positive electrode current collector can be a metal foil or a composite current collector. As an example of the metal foil, an aluminum foil or an aluminum alloy foil can be used. The composite current collector may include a high molecular material substrate layer and a metal material layer formed on at least one surface of the high molecular material substrate layer. As an example, the metal material may include a combination of one or more selected from aluminum, aluminum alloy, nickel, nickel alloy, titanium, titanium alloy, silver and silver alloy, and the high molecular material substrate layer may include a combination of one or more selected from polypropylene (PP), polyethylene terephthalate (PET), polybutylene terephthalate (PBT), polystyrene (PS), and polyethylene (PE).

In some embodiments, the positive electrode active material layer further optionally includes a positive electrode conductive agent. The embodiments of the present application has no specific limitation on the type of the positive electrode conductive agent, and as an example, the positive electrode conductive agent includes a combination of one or more selected from superconducting carbon, conductive carbon black, conductive graphite, acetylene black, carbon black, Ketjen black, carbon dots, carbon nanotubes, graphene, and carbon nanofibers. In some embodiments, based on a total mass of the positive electrode active material layer, the percentage mass content of the positive electrode conductive agent is below 5%.

In some embodiments, the positive electrode active material layer further optionally includes a positive electrode binder. The embodiments of the present application has no specific limitation on the type of the positive electrode binder, and as an example, the positive electrode binder may include a combination of one or more selected from polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, and a fluorinated acrylate resin. In some embodiments, based on the total mass of the positive electrode active material layer, the percentage mass content of the positive electrode binder is below 5%. Compared with the crystallinity of the fluoropolymer of the embodiments of the present application, the crystallinity of the positive electrode binder is higher. Compared with the melting temperature of the fluoropolymer of the embodiments of the present application, the melting temperature of the positive electrode binder is higher.

The positive electrode active material layer is generally formed by coating a positive electrode slurry on the positive electrode current collector, followed by drying and cold pressing. The positive electrode slurry is generally formed by dispersing the positive electrode active material, the optional conductive agent, the optional binder and any other components in a solvent and evenly stirring the mixture. The solvent may be N-methyl pyrrolidone (NMP), but is not limited thereto. Of course, the preparation of the positive electrode sheet is not limited to the aforementioned method, and the preparation method described above can also be used.

[Negative Electrode Sheet]

In some embodiments, the negative electrode sheet includes a negative electrode current collector and a negative electrode active material layer disposed on at least one surface of the negative electrode current collector and including a negative electrode active material.

As an example, the negative electrode current collector has two surfaces opposite in its own thickness direction, and the negative electrode active material layer is disposed on either or both of the two opposite surfaces of the negative electrode current collector.

A negative electrode active material for a battery cell well known in the art can be used as the negative electrode active material. As an example, the negative electrode active material may include, but is not limited to, at least one of natural graphite, artificial graphite, soft carbon, hard carbon, a silicon-based material, a tin-based material, and lithium titanate. The silicon-based material may include at least one of elemental silicon, a silicon oxide, a silicon-carbon composite, a silicon-nitrogen composite, and a silicon alloy material. The tin-based material may include at least one of elemental tin, a tin oxide, and a tin alloy material.

In some embodiments, the negative electrode active material layer further optionally includes a negative electrode conductive agent. The embodiments of the present application has no specific limitation on the type of the negative electrode conductive agent, and as an example, the negative electrode conductive agent may include at least one of superconducting carbon, conductive graphite, acetylene black, carbon black, Ketjen black, carbon dots, carbon nanotubes, graphene, and carbon nanofibers. In some embodiments, based on a total mass of the negative electrode active material layer, the percentage mass content of the negative electrode conductive agent is ≤5%.

In some embodiments, the negative electrode active material layer further optionally includes a negative electrode binder. The embodiments of the present application has no specific limitation on the type of the negative electrode binder, and as an example, the negative electrode binder may include at least one of styrene butadiene rubber (SBR), a water-soluble unsaturated resin SR-1B, a water-based acrylic resin (e.g., polyacrylic acid PAA, polymethacrylic acid PMAA, and sodium polyacrylate PAAS), polyacrylamide (PAM), polyvinyl alcohol (PVA), sodium alginate (SA), and carboxymethyl chitosan (CMCS). In some embodiments, based on a total mass of the negative electrode active material layer, the percentage mass content of the negative electrode binder is ≤5%.

In some embodiments, the negative electrode active material layer further optionally includes other auxiliaries. As an example, the other auxiliaries may include a thickener, e.g., carboxymethyl cellulose sodium (CMC), a PTC thermistor material, and the like. In some embodiments, based on a total mass of the negative electrode active material layer, the percentage mass content of the other auxiliaries is ≤2%.

In some embodiments, the negative electrode current collector may be a metal foil or a composite current collector. As an example of the metal foil, a copper foil can be adopted. The composite current collector may include a high molecular material substrate layer and a metal material layer formed on at least one surface of the high molecular material substrate layer. As an example, the metal material may include at least one of copper, a copper alloy, nickel, a nickel alloy, titanium, a titanium alloy, silver, and a silver alloy. As an example, the high molecular material substrate layer may include at least one of polypropylene (PP), polyethylene terephthalate (PET), polybutylene terephthalate (PBT), polystyrene (PS), and polyethylene (PE).

The negative electrode active material layer is generally formed by coating a negative electrode slurry on the negative electrode current collector, followed by drying and cold pressing. The negative electrode slurry is generally formed by dispersing the negative electrode active material, the optional conductive agent, the optional binder, and the other optional auxiliaries in a solvent and evenly stirring the mixture. The solvent may be N-methyl pyrrolidone (NMP) or deionized water, but is not limited thereto. Of course, the preparation of the negative electrode sheet is not limited to the aforementioned method, and the preparation method described above can also be used.

The negative electrode sheet does not exclude other additional functional layers other than the negative electrode active material layer. For example, in some embodiments, the negative electrode sheet in the present application further includes a conductive primer coating (e.g., composed of a conductive agent and a binder) sandwiched between the negative electrode current collector and the negative electrode active material layer and disposed on a surface of the negative electrode current collector. In some other embodiments, the negative electrode sheet of the present application further includes a protective layer covering a surface of the negative electrode active material layer.

[Electrolyte Solution]

During a charging and discharging process of the battery cell, active ions are intercalated and deintercalated back and forth between the positive electrode sheet and the negative electrode sheet, and the electrolyte solution serves to conduct the active ions between the positive electrode sheet and the negative electrode sheet. The present application has no specific limitation on the type of the electrolyte solution, and it can be selected according to actual requirements.

The electrolyte solution includes an electrolyte salt and a solvent. The types of the electrolyte salt and the solvent are not specifically limited, and may be selected according to actual requirements.

When the battery cell of the present application is a lithium-ion battery, as an example, the electrolyte salt may include, but is not limited to at least one of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), bistrifluoromethanesulfonimide lithium (LiTFSI), lithium triflate (LiTFS), lithium difluoro(oxalato)borate (LiDFOB), lithium dioxalato borate (LiBOB), lithium difluorophosphate ($LiPO_2F_2$), lithium difluoro bis(oxalato)phosphate (LiDFOP) and lithium tetrafluoro(oxalato)phosphate (LiTFOP).

When the battery cell of the present application is a sodium-ion battery, as an example, the electrolyte salt may include, but is not limited to at least one of sodium hexafluorophosphate ($NaPF_6$), sodium tetrafluoroborate ($NaBF_4$), sodium perchlorate ($NaClO_4$), sodium hexafluoroarsenate ($NaAsF_6$), sodium bis(fluorosulfonyl)imide (NaFSI), sodium bis(trifluoromethanesulfonyl)imide (NaTFSI), sodium trifluoromethanesulfonate (NaTFS), sodium difluoro(oxalato)borate (NaDFOB), sodium bis(oxalate)borate (NaBOB), sodium difluorophosphate ($NaPO_2F_2$), sodium difluoro bis(oxalato)phosphate (NaDFOP), and sodium tetrafluoro(oxalato)phosphate (NaTFOP).

As an example, the solvent may include, but is not limited to at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methylsulfonylmethane (MSM), ethyl methyl sulfone (EMS), ethylsulfonylethane (ESE), tetrahydrofuran THF, 2-methyltetrahydrofuran 2me-thf, 1,3-dioxolane DOL, dimethoxymethane DMM, 1,2-dimethoxyethane DME, and diglyme DG.

In some embodiments, the electrolyte solution further optionally includes an additive. For example, the additive may include a negative-electrode film-forming additive, or may include a positive-electrode film-forming additive, or may include an additive capable of improving some performances of the battery, e.g. an additive for improving the overcharge performance of the battery, an additive for improving the high-temperature performance of the battery, an additive for improving the low-temperature powder performance of the battery, and the like.

In some embodiments, the positive electrode sheet, the separator, and the negative electrode sheet may be made into an electrode assembly by a winding process and/or a lamination process.

In some embodiments, the battery cell may include an outer package. The outer package can be used for packaging the aforementioned electrode assembly and the electrolyte solution.

In some embodiments, the outer package of the battery cell can be a hard shell, e.g. a hard plastic shell, an aluminum shell, a steel shell, etc. The outer package of the battery cell may also be a soft package, e.g. a bag-type soft package. A material of the soft package may be plastic, e.g. at least one of polypropylene (PP), polybutylene terephthalate (PBT), and polybutylene succinate (PBS).

In some embodiments, the positive electrode sheet, the separator, and the negative electrode sheet may be made into an electrode assembly by a winding process and/or a lamination process.

The present application has no specific limitation on the shape of the battery cell, which can be cylindrical, square or any other shape. For example, FIG. 1 shows a battery cell 5 in a square structure as an example.

Figure 2:
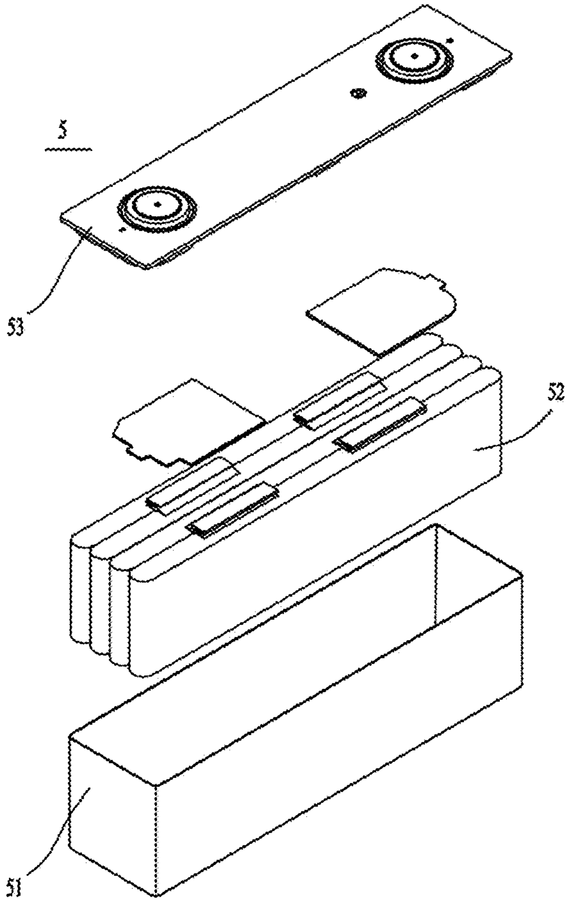
FIG. 2 is a schematic exploded view of the embodiment of the battery cell in FIG. 1.

In some embodiments, as shown in FIGS. 1 and 2, the outer package may include a case 51 and a cover plate 53. The case 51 may include a bottom plate and a side plate connected to the bottom plate, and the bottom plate and the side plate enclose to form an accommodating cavity. The case 51 has an opening in communication with the accommodating cavity, and the cover plate 53 is configured to cover the opening to close the accommodating cavity. The positive electrode sheet, the negative electrode sheet, and the separator may be formed into an electrode assembly 52 by a winding process or a lamination process. The electrode assembly 52 is encapsulated in the accommodating cavity. The electrode assembly 52 is impregnated with the electrolyte solution. A number of the electrode assembly 52 included in the battery cell 5 can be one or more, and can be adjusted according to requirements.

A method for preparing the battery cell of the present application is well known. In some embodiments, the positive electrode sheet, the separator, the negative electrode sheet, and the electrolyte solution may be assembled to form the battery cell. As an example, the positive electrode sheet, the separator, and the negative electrode sheet may form the electrode assembly by a winding process and/or a lamination process; the electrode assembly is placed in the outer package, oven-dried, and poured with the electrolyte solution; and the battery cell is obtained through processes such as vacuum encapsulation, standing, chemical formation, and shaping.

In some embodiments of the present application, the battery cell according to the present application can be assembled into a battery module, the number of battery cells included in the battery module may be multiple, and the specific number can be adjusted according to the application and capacity of the battery module.

Figure 3:
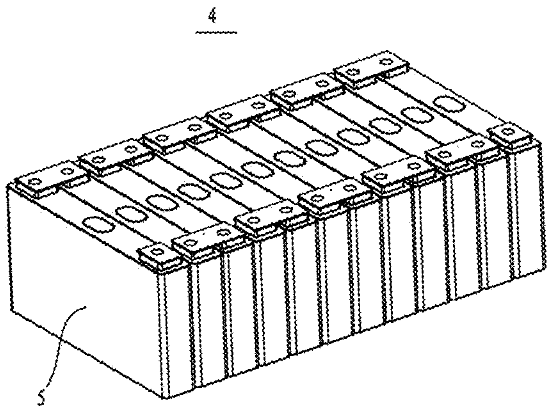
FIG. 3 is a schematic view of an embodiment of a battery module of the present application.

FIG. 3 is a schematic view of a battery module 4 as an example. As shown in FIG. 3, in the battery module 4, a plurality of battery cells 5 can be sequentially arranged in a length direction of the battery module 4. Of course, any other arrangements are also possible. The plurality of battery cells 5 may further be fixed by fasteners.

Optionally, the battery module 4 may further include a shell having an accommodating space, and the plurality of battery cells 5 are accommodated in the accommodating space.

In some embodiments, the aforementioned battery module can further be assembled into a battery pack, and the number of battery modules included in the battery pack can be adjusted according to the application and capacity of the battery pack.

Both the battery module 4 and the battery pack can be used as specific examples of batteries in the embodiments of the present application.

Figure 4:
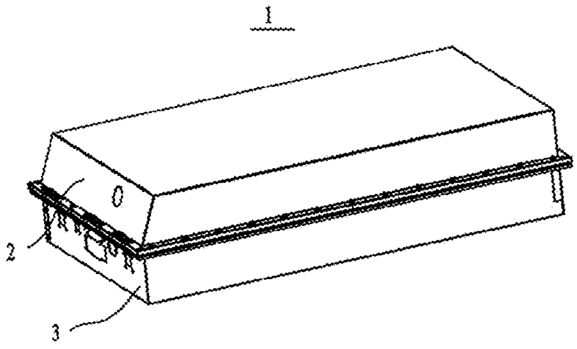
FIG. 4 is a schematic view of an embodiment of a battery pack of the present application.
Figure 5:
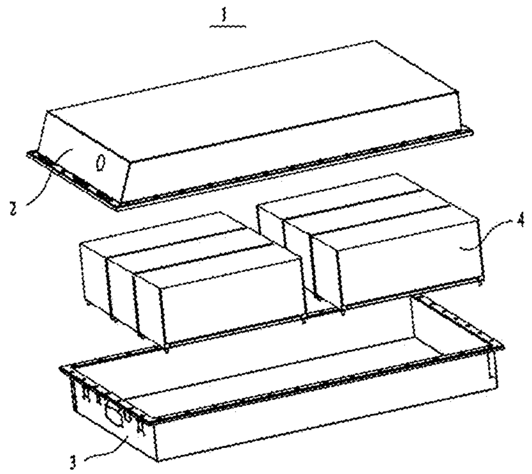
FIG. 5 is a schematic exploded view of the embodiment of the battery pack as shown in FIG. 4.

FIGS. 4 and 5 are schematic views of a battery pack 1 as an example. As shown in FIG. 4 and FIG. 5, the battery pack 1 may include a battery box and a plurality of battery modules 4 arranged in the battery box. The battery box includes an upper box body 2 and a lower box body 3, where the upper box body 2 is configured to cover the lower box body 3 to form an enclosed space for accommodating the battery modules 4. The plurality of battery modules 4 may be arranged in the battery box in any manner.

Electrical Device

In a third aspect, the present application provides an electrical apparatus, and the electrical apparatus includes at least one of the battery cell, the battery module, and the battery pack of the present application. The battery cell, the battery module, and the battery pack may be used as a power source of the electrical apparatus, or may be used as an energy storage unit of the electrical apparatus. The electrical apparatus may be, but is not limited to, a mobile device (e.g. a mobile phone, a laptop, etc.), an electric vehicle (e.g. an all-electric vehicle, a hybrid electric vehicle, a plug-in hybrid electric vehicle, an electric bicycle, an electric scooter, an electric golf cart, and an electric truck), an electric train, a ship, a satellite, an energy storage system, etc.

Figure 6:
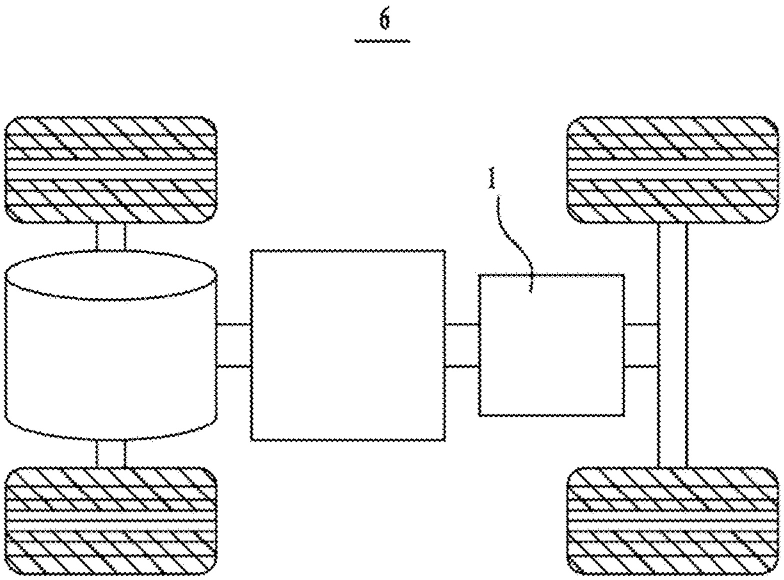
FIG. 6 is a schematic view of an embodiment of an electrical apparatus including the battery cell of the present application as a power source.

For the electrical apparatus, the battery cell, the battery module, or the battery pack can be selected according to use requirements of the electrical apparatus. FIG. 6 is a schematic view of an electrical apparatus as an example. This electrical apparatus 6 is an all-electric vehicle, a hybrid electric vehicle, or a plug-in hybrid electric vehicle, and the like. In order to meet the requirements of the electrical apparatus for high power and high energy density, a battery pack 1 or a battery module may be used. As another example, the electrical apparatus may be a mobile phone, a tablet, a laptop, etc. The electrical apparatus is generally required to be thin and light, and may use a battery cell as a power source.

EXAMPLES

Examples of the present application will be described below. The examples described below are exemplary and only used to explain the present application, and are not to be construed as limiting the present application. Where specific techniques or conditions are not specified in the examples, the techniques or conditions described in the literature of the art or the product specifications are followed. All of the used agents or instruments which are not specified with the manufacturer are conventional commercially-available products.

Example 1

Preparation of Lithium-Ion Battery (1) Preparation of Positive Electrode Sheet:

An aluminum foil with a thickness of 12 μm was used as a positive electrode current collector.

A positive electrode active material $LiNi_{0.6}Co_{0.2}Mn_{0.2}O_2$ (NCM622), carbon black as a conductive agent, polyvinylidene fluoride (PVDF) as a binder were fully mixed under stirring in a proper amount of N-methyl pyrrolidone (NMP) to prepare positive electrode slurry. The mass ratio of NCM622, conductive carbon black and PVDF in the positive electrode slurry was 97.5:1.4:1.1. The positive electrode slurry was coated on an aluminum foil as a current collector, dried in vacuum at 100° C., then cold pressed, then subjected to edge cutting, slicing, and striping, and then oven-dried at 85° C. under vacuum conditions for 4 h, to make a positive electrode sheet.

(2) Preparation of Negative Electrode Sheet:

A copper foil with a thickness of 8 μm was used as a negative electrode current collector.

Artificial graphite as a negative electrode active material, carbon black as a conductive agent, styrene butadiene rubber (SBR) as a binder, and sodium carboxymethylcellulose (CMC) as a thickener were mixed evenly at a weight ratio of 97.4:2:0.5:0.1, and then added into deionized water, to make a negative electrode slurry. The negative electrode slurry was coated on the copper foil as the current collector, oven-dried at 85° C., then cold-pressed and subjected to edge cutting, slicing, and striping, and then oven-dried under vacuum conditions at 120° C. for 12 h to make a negative electrode sheet.

(3) Preparation of Electrolyte Solution:

In an environment with a water content of less than 10 ppm, a non-aqueous organic solvent ethylene carbonate EC and ethyl methyl carbonate EMC were mixed in a volume ratio of 3:7 to obtain a solvent of an electrolyte solution, and then a lithium salt $LiPF_6$ was mixed with the mixed solvent to formulate an electrolyte solution with a lithium salt concentration of 1 mol/L.

(4) Preparation of Separator

A polyethylene (PE) film of 7 μm was used as a substrate.

15 g of a fluoropolymer was dispersed in 100 mL of dimethyl carbonate DMC as a solvent to form a mixed system, and the mixed system was atomized and sprayed on both surfaces of the polyethylene film to form polymer layers respectively. Water was used as the atomizing solvent, and the mass content of the mixed system was 1%.

(5) Preparation of Lithium-Ion Battery:

The positive electrode sheet, the separator, and the negative electrode sheet mentioned above were stacked in order, so that the separator was positioned between the positive electrode sheet and the negative electrode sheet to play an isolating role, and then wound to obtain an electrode assembly. The electrode assembly was placed into a shell of an outer package, dried, and then poured with the electrolyte solution; and subjected to vacuum packaging, standing, chemical formation, shaping and the like procedures to obtain a lithium-ion battery.

Comparative Example 1

A lithium-ion battery was prepared by a method similar to that of Example 1. The difference from Example 1 was that the separator in Comparative Example 1 was a polyethylene (PE) film with a thickness of 7 μm.

Comparative Example 2

A lithium-ion battery was prepared by a method similar to that of Example 1. The difference from Example 1 was that the material of the fluoropolymer in the separator in Comparative Example 2 was replaced.

Example 2-1 to Example 2-4

A lithium-ion battery was prepared by a method similar to that of Example 1. The difference from Example 1 was that the materials of the fluoropolymers in the separators in Example 2-1 to Example 2-4 were replaced.

Example 3-1 to Example 3-5

A lithium-ion battery was prepared by a method similar to that of Example 1. The difference from Example 1 was that the thicknesses of the polymer layers in the separators in Example 3-1 to Example 3-5 were adjusted.

Example 4-1

A lithium-ion battery was prepared by a method similar to that of Example 1. The difference from Example 1 was that the setting position of the polymer layer of the separator was adjusted in Example 4-1. Specifically, the preparation steps of the separator included:

a polyethylene (PE) film of 7 μm was used as a substrate of the separator;

The silicon oxide compound particles and the aqueous solution type polyacrylic acid as the binder were evenly mixed in a proper amount of deionized water as the solvent at a mass ratio of 20:80 to obtain a coating slurry.

The formulated coating slurry was applied on 2 surfaces of the PE substrate with a coater to form a heat-resistant coating.

15 g of a fluoropolymer was dispersed in 100 mL of dimethyl carbonate DMC as a solvent to form a mixed system, and the mixed system was atomized and sprayed on the surfaces of the heat-resistant coating to form polymer layers, so as to obtain the separator. Water was used as the atomizing solvent, and the mass content of the mixed system was 1%.

Example 4-2 to Example 4-6

A lithium-ion battery was prepared by a method similar to that of Example 1. The difference from Example 1 was that the composition of the polymer layer of the separator was adjusted in Example 4-2 to Example 4-6. Specifically, the preparation steps of the separator included:

a polyethylene (PE) film of 7 μm was used as a substrate of the separator;

The silicon oxide compound particles and 15 g of a fluoropolymer were dispersed in 100 mL of dimethyl carbonate DMC as a solvent to form a mixed system, and the mixed system was atomized and sprayed on the surfaces of the heat-resistant coating to form polymer layers, so as to obtain the separator. Among them, the mass ratio of the silicon oxide compound particles and the fluoropolymer in Example 4-2 was 1.5:1; the mass ratio of the silicon oxide compound particles and the fluoropolymer in Example 4-3 was 0.5:1; the mass ratio of the silicon oxide compound particles and the fluoropolymer in Example 4-4 was 2:1; the mass ratio of the silicon oxide compound particles and the fluoropolymer in Example 4-5 was 0.2:1; and the mass ratio of the silicon oxide compound particles and the fluoropolymer in Example 4-5 was 0.5:1.

Data of the examples and the comparative examples was as shown in Table 1.

Testing Section

1. Capacity Retention Rate Test for Lithium-Ion Battery

The aforementioned lithium-ion batteries prepared in the examples and comparative examples were charged at a constant current of ⅓ C to 4.25 V in a room temperature environment, then charged at a constant voltage of 4.25 V to a current of 0.05 C, allowed to stand for 5 min, and then discharged at ⅓ C to 2.8 V. The obtained capacity was recorded as initial capacity C0. Then the batteries were transferred to an environment at 60° C. for storage. The aforementioned steps were repeated for the same battery above, and meanwhile the discharge capacity Cn of the battery per 30 D was recorded, then the battery capacity retention rate after each 30 D was Pn=Cn/C0*100%; with the 6 point values of P1, P2. . . . P6 as the vertical coordinates, and the corresponding storage times as the horizontal coordinates, a dot chart of the battery capacity retention rate vs the storage days was obtained. The data of the battery capacity retention rate in Table 1 was the data measured after storage under the aforementioned test conditions for 180 D, i.e., the value of P6.

2. Directive Current Resistance Test for Lithium-Ion Battery

At 25° C., the aforementioned lithium-ion batteries prepared in the examples and comparative examples were charged at a constant current of ⅓C to 4.25 V, then charged at a constant voltage of 4.25 V to a current of 0.05 C, and allowed to stand for 5 min, and the voltage V1 was recorded. Then, the batteries were discharged at ⅓ C for 30 s, and the voltage V2 was recorded, so that (V2−V1)/⅓ C to obtain an internal resistance DCR1 of the batteries after the first cycle. Then the batteries were transferred to an environment at 60° C. for storage. The aforementioned steps were repeated for the same battery above, and meanwhile the internal resistance DCRn (n=1, 2, 3, . . . , and 6) of the battery after the n-th cycle was recorded. A graph of the discharge DCIR of the battery vs the storage days was obtained with the aforementioned 6 point values of DCR1, DCR2, DCR3, . . . , and DCR6 as the vertical coordinates and with the corresponding number of cycles as the horizontal coordinates.

In Table 1, the increase ratio of battery internal resistance=(DCRn−DCR1)/DCR1*100%. The data in Table 1 was the data measured after storage under the aforementioned test conditions for 180 D.

Test Result

The test results were as shown in Table 1.

TABLE 1

| | Polymer layer of separator | | | | | |
|---|---|---|---|---|---|---|
| | Fluoropolymer | | | | | |
| Item | Monomer 1 | Monomer 2 | Monomer 3 | Crystallinity Xc % | melting temperature Tm (° C.) | Glass-transition temperature (° C.) |
| Comparative Example 1 | None | None | None | None | None | None |
| Comparative Example 2 | 95% VDF | 5% TFE | / | 48 | 167 | 56 |
| Example 1 | 90% VDF | 10% HFP | / | 20 | 125 | −50 |
| Example 2-1 | 80% VDF | 15% HFP | 5% TFE | 25 | 135 | 35 |
| Example 2-2 | 75% VDF | 25% HFP | / | 11 | 112 | −65 |
| Example 2-3 | 75% VDF | 22% HFP | 3% Ethylene | 10 | 110 | −69 |
| Example 3-1 | 90% VDF | 10% HFP | / | 20 | 125 | −50 |
| Example 3-2 | 90% VDF | 10% HFP | / | 20 | 125 | −50 |
| Example 3-3 | 90% VDF | 10% HFP | / | 20 | 125 | −50 |
| Example 3-4 | 90% VDF | 10% HFP | / | 20 | 125 | −50 |
| Example 3-5 | 90% VDF | 10% HFP | / | 20 | 125 | −50 |
| Example 4-1 | 90% VDF | 10% HFP | / | 20 | 125 | −50 |
| Example 4-2 | 90% VDF | 10% HFP | / | 20 | 125 | −50 |

TABLE 1-continued

| | | | | | | |
|---|---|---|---|---|---|---|
| Example 4-3 | 90% VDF | 10% HFP | / | 20 | 125 | −50 |
| Example 4-4 | 90% VDF | 10% HFP | / | 20 | 125 | −50 |
| Example 4-5 | 90% VDF | 10% HFP | / | 20 | 125 | −50 |
| Example 4-6 | 90% VDF | 10% HFP | / | 20 | 125 | −50 |

| | Polymer layer of separator | | | Performance of lithium-ion battery | |
|---|---|---|---|---|---|
| | Fluoropolymer | | Coating | | |
| Item | Molecular weight (g/mol) | Precipitation value m/q | weight (mg/1,540.25 mm$^2$) | Capacity retention rate % | DCIR % |
| Comparative Example 1 | None | None | None | 80.0% | 40.0% |
| Comparative Example 2 | 1.3 million | 1.2 | 1.5 | 75.0% | 48.0% |
| Example 1 | 600,000 | 20 | 1.5 | 95.8% | 6.0% |
| Example 2-1 | 600,000 | 25 | 1.5 | 92.3% | 10.0% |
| Example 2-2 | 650,000 | 30 | 1.5 | 93.7% | 9.3% |
| Example 2-3 | 700,000 | 32 | 1.5 | 95.0% | 7.0% |
| Example 3-1 | 600,000 | 20 | 1.0 | 95.3% | 7.0% |
| Example 3-2 | 600,000 | 20 | 2.0 | 93.0% | 9.0% |
| Example 3-3 | 600,000 | 20 | 0.5 | 87.0% | 21.5% |
| Example 3-4 | 600,000 | 20 | 3.0 | 91.5% | 10.4% |
| Example 3-5 | 600,000 | 20 | 3.5 | 89.0% | 15.9% |
| Example 4-1 | 600,000 | 20 | 1.5 | 96.0% | 6.7% |
| Example 4-2 | 600,000 | 20 | 1.5 | 94.2% | 8.6% |
| Example 4-3 | 600,000 | 20 | 1.5 | 90.0% | 13.0% |
| Example 4-4 | 600,000 | 20 | 1.5 | 93.8% | 11.0% |
| Example 4-5 | 600,000 | 20 | 1.5 | 83.0% | 26.3% |
| Example 4-6 | 600,000 | 20 | 1.5 | 89.7% | 22.5% |

In Table 1, VDF represented vinylidene fluoride, HFP represented hexafluoropropylene, and TFE represented tetrafluoroethylene, where 90% VDF referred to that the percentage molar content of VDF was 90% based on the total molar amount of VDF and HFP, and 10% FEP referred to that the percentage molar content of FEP was 10%.

It could be seen from Table 1 that, compared with Comparative Example 1, the storage performance of the lithium-ion battery was improved by adding the fluoropolymer of the present application to the separator in the embodiments of the present application. Although a polymer was added to the separator of Comparative Example 2, the polymer was not conducive to the rapid diffusion of the electrolyte solution, so that the performance of the lithium-ion battery could not be effectively improved.

Compared with Comparative Example 2, when the embodiments of the present application satisfied $0<X_C\leq30$ and $0<T_m\leq140$, the molecular chains of the embodiments of the present application tended to be loosely arranged, the interaction force among the molecular chains was small, the adjacent molecular chains were easily opened, and the chain segment movement was achieved through the intermolecular internal rotation, forming a molecular chain structure with high flexibility. This could more significantly improve the cycling performance and storage performance of the lithium-ion battery.

While the present application has been described with reference to the preferred embodiments, various modifications may be made and components thereof may be replaced with equivalents without departing from the scope of the present application. In particular, the technical features mentioned in the various embodiments can be combined in any manner as long as there is no structural conflict. The present application is not limited to the particular embodiments disclosed herein, but rather includes all technical solutions falling within the scope of the claims.

What is claimed is:

1. A separator, comprising:

a separator body;

a polymer layer disposed on at least one surface of the separator body, the polymer layer comprising a fluoropolymer, wherein a crystallinity of the fluoropolymer as measured by a differential scanning calorimetry method is $X_C$ %, wherein $0<X_C\leq30$;

a melting temperature of the fluoropolymer is Tm, the unit thereof being ° C., wherein $0<Tm\leq140$; and the fluoropolymer comprises at least one of a building block of formula (III-1) to a building block of formula (III-3), formula (III-1)

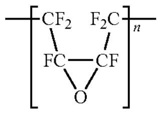

, formula (III-2)

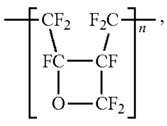

, and

-continued formula (III-3)

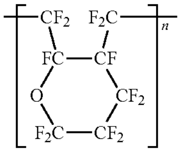, and n is a positive integer selected from 1,000 to 30,000.

2. The separator according to claim 1, wherein a glass-transition temperature of the fluoropolymer is Tg, the unit thereof being ° C., wherein −150≤Tg≤60.

3. The separator according to claim 1, wherein the fluoropolymer further comprises at least one of a building block of formula (I) to a building block of formula (II), formula (I)

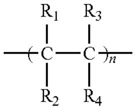, formula (II)

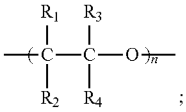;

in the formula (I) and the formula (II), $R_1$, $R_2$, $R_3$ and $R_4$ each independently comprise a hydrogen atom, a fluorine atom, a chlorine atom, substituted or unsubstituted C1-C3 alkyl or substituted or unsubstituted C1-C3 alkoxy, and at least one of the $R_1$, the $R_2$, the $R_3$ and the $R_4$ comprises a fluorine atom; and n is the positive integer selected from 1,000 to 30,000.

4. The separator according to claim 1, wherein the fluoropolymer further comprises at least one of a building block of formula (I-1) to a building block of formula (I-11), formula (I-1)

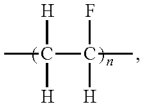, formula (I-2)

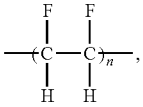, formula (I-3)

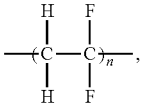, formula (I-4)

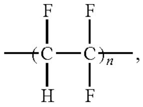, formula (I-5)

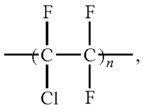,

-continued formula (I-6)

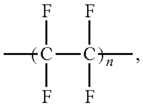, formula (I-7)

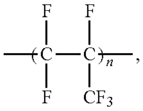, formula (I-8)

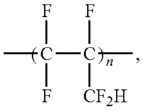, formula (I-9)

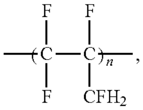, formula (I-10)

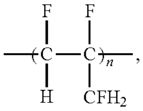, and formula (I-11)

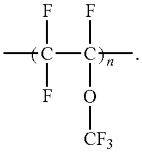.

5. The separator according to claim 1, wherein the fluoropolymer further comprises at least one of a building block of formula (II-1) to a building block of formula (II-5), formula (II-1)

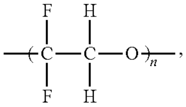, formula (II-2)

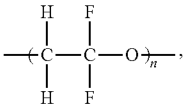, formula (II-3)

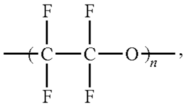, formula (II-4)

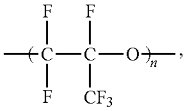, and formula (II-5)

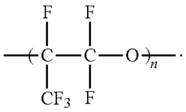.

6. The separator according to claim 3, wherein n is the positive integer selected from 5,000 to 20,000; and/or a molecular weight of the fluoropolymer is $2\times10^5$ g/mol to $1.5\times10^6$ g/mol.

7. The separator according to claim 1, wherein the fluoropolymer is added into a first solvent at 70° C. to form a fluoropolymer system;

the fluoropolymer system is allowed to stand at 70° C. for 8 h and at 25° C. for ≥24 h, and then the fluoropolymer system is filtered through a 200-mesh filter to leave a first substance, wherein a mass of the fluoropolymer is q, the unit thereof being g; a mass of the first substance is m, the unit thereof being g; and the fluoropolymer and the first substance satisfy: $5\leq m/q\leq 1{,}000$.

8. The separator according to claim 1, wherein the separator body comprises a substrate, and the polymer layer is disposed on at least one surface of the substrate.

9. The separator according to claim 1, wherein the separator body comprises a substrate and a heat-resistant coating, the heat-resistant coating is disposed on at least one surface of the substrate, and the polymer layer is disposed on a surface of the heat-resistant coating facing away from the substrate.

10. The separator according to claim 1, wherein the polymer layer further comprises a heat-resistant particle; based on a total mass of the polymer layer, a ratio of a percentage mass content of the fluoropolymer to a percentage mass content of the heat-resistant particle is (0.2 to 5):1.

11. The separator according to claim 1, wherein a coating weight of the polymer layer is 0.5 mg/1,540.25 $mm^2$ to 5 mg/1,540.25 $mm^2$.

12. A battery cell, comprising the separator according to claim 1.

13. A battery, comprising the battery cell according to claim 12.

14. An electrical apparatus, comprising the battery according to claim 13.

* * * * *